United States Patent
Beltrand et al.

(10) Patent No.: US 12,190,524 B2
(45) Date of Patent: Jan. 7, 2025

(54) METHOD FOR SEGMENTING AN OBJECT IN AN IMAGE

(71) Applicant: DASSAULT SYSTEMES, Velizy Villacoublay (FR)

(72) Inventors: Nicolas Beltrand, Velizy Villacoublay (FR); Mourad Boufarguine, Velizy Villacoublay (FR); Vincent Guitteny, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 647 days.

(21) Appl. No.: 17/384,299

(22) Filed: Jul. 23, 2021

(65) Prior Publication Data

US 2022/0036563 A1    Feb. 3, 2022

(30) Foreign Application Priority Data

Jul. 30, 2020    (EP) .................................... 20305874

(51) Int. Cl.
*G06T 7/13*    (2017.01)
*G06N 3/08*    (2023.01)
*G06T 7/143*    (2017.01)
*G06T 7/162*    (2017.01)
(Continued)

(52) U.S. Cl.
CPC ................ *G06T 7/13* (2017.01); *G06N 3/08* (2013.01); *G06T 7/143* (2017.01); *G06T 7/162* (2017.01); *G06T 7/80* (2017.01); *G06T 11/203* (2013.01); *G06T 2207/20076* (2013.01);
(Continued)

(58) Field of Classification Search
CPC ........... G06T 7/13; G06T 7/143; G06T 7/162; G06T 7/80; G06T 11/203; G06T 2207/20076; G06T 2207/20081; G06T 2207/20084; G06T 2210/12; G06T 2207/20101; G06T 2207/20116; G06T 7/136; G06T 2207/10016; G06T 7/194; G06T 2207/20072; G06T 2207/20096;
(Continued)

(56) References Cited

U.S. PATENT DOCUMENTS

2012/0114240 A1 * 5/2012 Yamada .................. G06T 7/194
                                                              382/173
2022/0036108 A1 * 2/2022 Zhang .................... G06V 20/62

FOREIGN PATENT DOCUMENTS

CN        109242869 A     1/2019
WO     WO 2008/151270 A1  12/2008

OTHER PUBLICATIONS

Extended Search Report issued Jan. 26, 2021 in Europe Patent Application No. 20305874.8—1210 (21 pages).

* cited by examiner

*Primary Examiner* — Molly Wilburn
(74) *Attorney, Agent, or Firm* — Oblon, McClelland, Maier & Neustadt, L.L.P.

(57) ABSTRACT

A computer-implemented method for segmenting an object in at least one image acquired by a camera including computing an edge probabilities image based on the image, said edge probabilities image comprising, for each pixel of the image, the probability that said pixel is an edge, computing a segmentation probabilities image based on the image (IM), said segmentation probabilities image comprising, for each pixel of the image (IM), the probability that said pixel belongs to the object (OBJ), and computing a binary mask of the object based on the edge probabilities image and based on the segmentation probabilities image.

17 Claims, 9 Drawing Sheets

(51) Int. Cl.
*G06T 7/80* (2017.01)
*G06T 11/20* (2006.01)
(52) U.S. Cl.
CPC .............. *G06T 2207/20081* (2013.01); *G06T 2207/20084* (2013.01); *G06T 2210/12* (2013.01)
(58) Field of Classification Search
CPC ... G06T 2207/20152; G06T 7/12; G06N 3/08; G06F 18/2415
See application file for complete search history.

METHOD FOR SEGMENTING AN OBJECT IN AN IMAGE

CROSS-REFERENCE TO RELATED APPLICATIONS

This application claims priority under 35 U.S.C. § 119 or 365 to European Application No. 20305874.8, filed Jul. 30, 2020. The entire contents of the above application(s) are incorporated herein by reference

FIELD

The disclosure pertains to the field of computer vision and image processing, in particular for applications such as object tracking, object detection or 3D reconstruction.

BACKGROUND

Image segmentation is the process of partitioning a digital image into multiple groups of pixels. This technique gives a very granular understanding of an object in an image, which is then easier to analyze. In the present disclosure, there are only two groups of pixels, i.e. the object of interest and the background. The resulting binary segmentation is called a mask.

When an object is photographed from different viewpoints, in order to create a 3D model out of it (3D scanning), one kind of post processing of all the captured images consists in segmenting each of the images.

FIGS. 1A to 1D illustrate screenshots of a playback of a 3D scanning of an object (a statue), and the resulting mask, superimposed on the image, in semi-transparency. The mask has been computed thanks to the method which is disclosed in Qiang et al. ("*Fast Online Object Tracking and Segmentation: A Unifying Approach*", CVPR, 2019). The article discloses a segmentation method which uses Deep Learning. The user needs to place approximately, in the 2D image, a bounding rectangle around the object to segment, and then the network infers a mask. The algorithm can be used to track an object in a sequence of images, and thus, provide one mask for each image. It turns out that the mask is not precise enough, and does not respect the boundary of the object. As it can be seen on FIGS. 1B, 1C and 1D, the mask tends to "drool", which is particularly visible over the head of the statue. Therefore, the segmentation needs to be as accurate as possible, in order to avoid a "drool" effect.

Other existing approaches have tackled the issue of computing a 2D segmentation of an object in a 2D image, without necessarily limiting to the context of segmentation of the same object captures from different viewpoints.

Boykov et al. ("Graph Cuts and Efficient N-D Image Segmentation", International Journal of Computer Vision, volume 70, pages 109-131, 2006) introduced an energy based object segmentation, using a cost function which combines a regional term and a boundary term. Basically, the boundary term reflects the image gradient between neighboring pixels, whereas the regional term reflects how the intensity of a pixel fits into a given intensity models (e.g. histograms) of the object and background. As illustrated in FIG. 8 of the cited article, the segmentation of an image is made in two steps. Firstly, an initial segmentation is made for a given set of seeds (hard constraints that can be placed automatically using simple template matching), the seeds being loosely positioned inside and, correspondingly, outside of the object of interest. Secondly, the user corrects the seeds: by reviewing the results of initial segmentation the user may observe that some areas are segmented incorrectly. Therefore, he can edit the segmentation, by placing additional seeds in the incorrectly segmented image, via mouse operated brush of red (for object) or blue (for background) color.

This method is not quite precise, because of the imprecision of the computed image gradient, and because of the imprecision of the given intensity models. It may also require many user strokes to produce a good result (depending on the colors and illumination of the object). In addition, a layman would have difficulties in drawing pertinent strokes, i.e. at the right place of the image.

Therefore, there is a need for providing a computer-implemented method for segmenting an object in at least one image acquired by a camera, which requires few and easy user inputs, and which provides a better segmentation quality than in the prior art, especially for a multiple view image segmentation.

SUMMARY

An object of the present disclosure is a computer-implemented method for segmenting an object in at least one image acquired by a camera, comprising the steps of:
a) computing an edge probabilities image based on the image, said edge probabilities image comprising, for each pixel of the image, the probability that said pixel is an edge;
b) computing a segmentation probabilities image based on the image, said segmentation probabilities image comprising, for each pixel of the image, the probability that said pixel belongs to the object;
c) computing a binary mask of the object based on the edge probabilities image and based on the segmentation probabilities image.

Another object of the present disclosure is a computer program product, stored on a computer-readable data-storage medium, comprising computer-executable instructions to cause a computer system interfaced to a camera to carry out the predefined method.

Another object of the present disclosure is a computer-readable data-storage medium containing computer-executable instructions to cause a computer system interfaced to a camera to carry out the predefined method.

Another object of the present disclosure is a computer system comprising a processor coupled to a memory, a screen and a camera, the memory storing computer-executable instructions to cause the computer system to carry out the predefined method.

BRIEF DESCRIPTION OF THE DRAWINGS

Additional features and advantages of the present disclosure will become apparent from the subsequent description, taken in conjunction with the accompanying drawings.

DETAILED DESCRIPTION

Figure 1A:
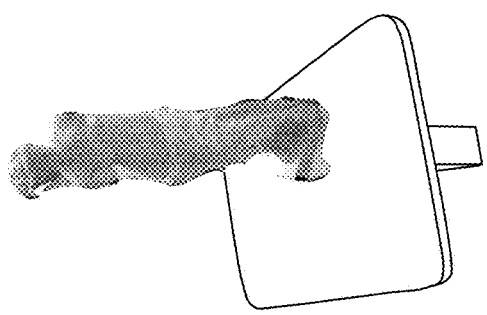
FIGS. 1A-1D, already discussed, are screenshots of state of the art multiview segmentations.
Figure 1B:
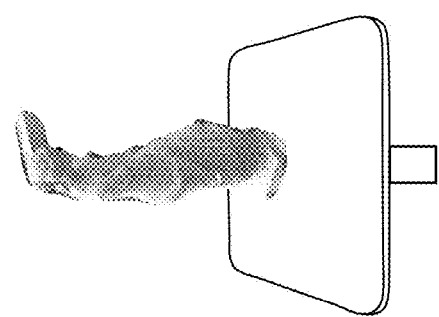
Figure 1C:
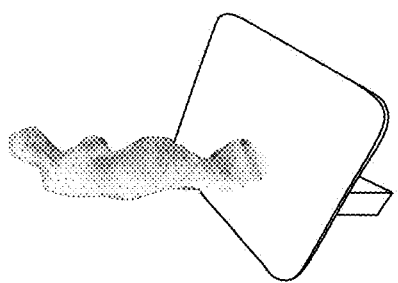
Figure 1D:
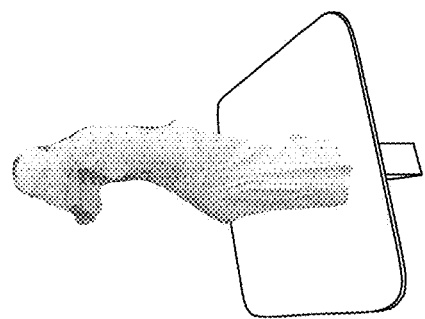
Figure 2:
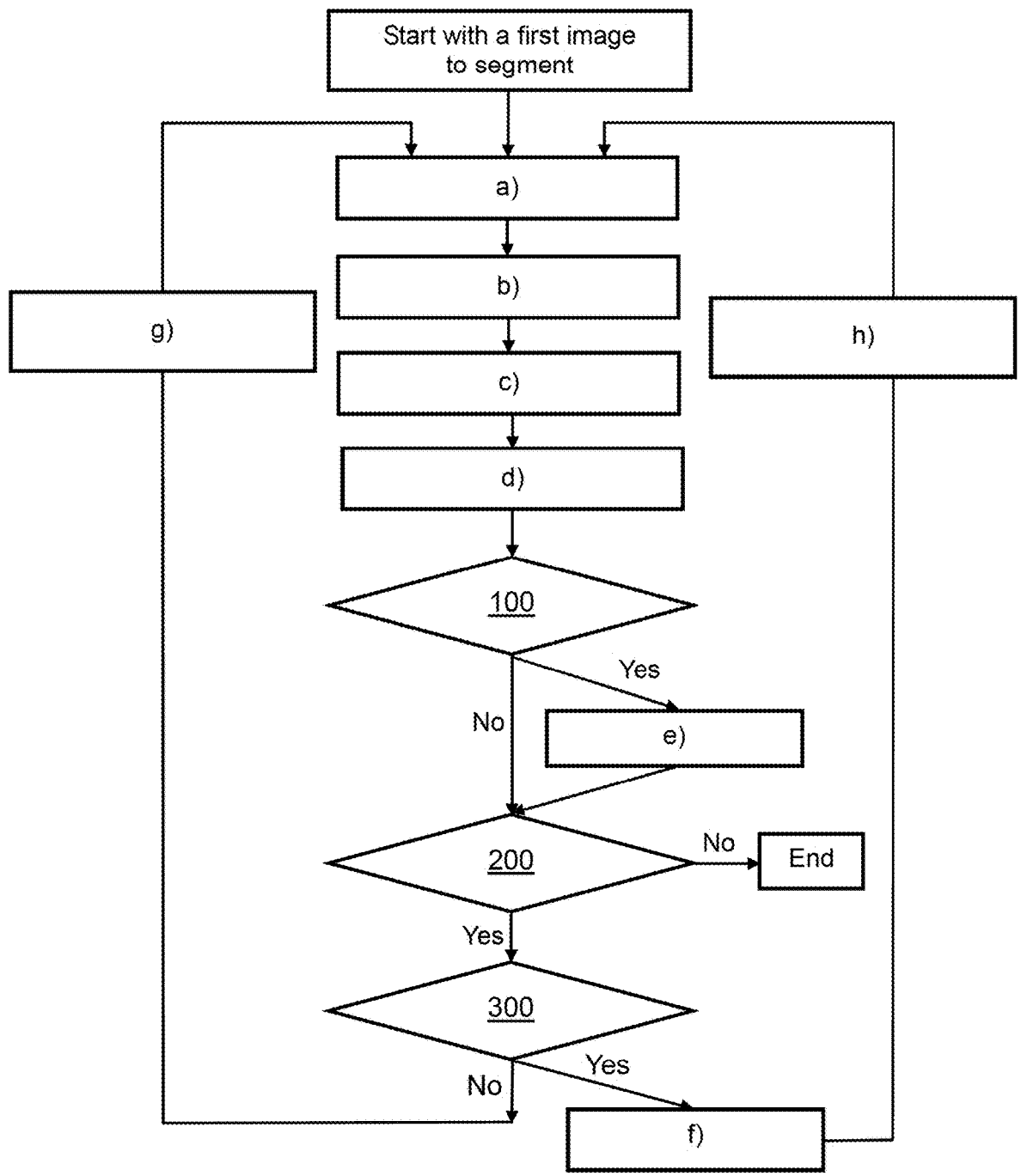
FIG. 2 is a flowchart of the method according to an embodiment.

Referring to FIG. 2, the segmentation starts with a first image IM of the object for which a segmentation has to be done. The image IM has been acquired, beforehand, by a camera. The image IM may be extracted from a continuous flow of images (video sequence) which have been acquired from different viewpoints around the object, or may be considered as a part of a discrete sequence of images which have been acquired from different object's viewpoints.

In a first step a), an edge probabilities image EPI is computed. The detection of edges works by detecting brightness discontinuities in the image. Detecting edges and object boundaries may be done with different algorithms, such as the Sobel method, the Canny method, the Prewitt method, the Roberts method, or fuzzy logic methods. In an embodiment, a deep learning algorithm is used. More particularly, the deep learning algorithm uses a holistically-nested edge detection, since this algorithm is particularly adapted for training and predicting edges in an image-to-image fashion. The skilled person may refer to the article "*Holistically-Nested Edge Detection*" (Xie et al., 2015 IEEE International Conference on Computer Vision), and also to the source code and pretrained models which are available online at github.com/s9xie/hed. Based on the detected edges, it can be determined, for each pixel of the image IM, the probability that the pixel is an edge or not.

The image of the edges obtained by the holistically-nested edge detection network is in shades of gray on 8 bits per pixel. Thus, each pixel has an intensity between 0 and 255, and is interpreted as a probability. The network is trained in a supervised manner (for each training image, the ground truth image containing the edges to be obtained is provided). The network is trained thanks to a loss function which compares the pixels of this ground truth image and the ones which are predicted.

The network is trained by associating, for a training image, each pixel with a category {edge, not edge}. The network predicts an image for which each pixel has a probability of belonging to each category (or only one category because here we can derive the other). Therefore For a truly edge pixel, we aim at the probability 1 for the edge category, or 0 if it is not an edge. The probability values are non-binary, so naturally, to optimize the loss, some uncertain pixels will have a probability in]0, 1[.

By using the holistically-nested edge detection, it can also be determined the probability that the pixel is an edge. An illustration of the edge probabilities image EPI is given FIG. 3.

Then, in a second step b), a segmentation probabilities image SPI is computed. The segmentation probabilities image SPI can also be implemented before step a), or simultaneously; without impacting the invented method.

The segmentation probabilities image SPI comprises, for each pixel of the image IM, the probability that said pixel belongs to the object OBJ.

Figure 3:
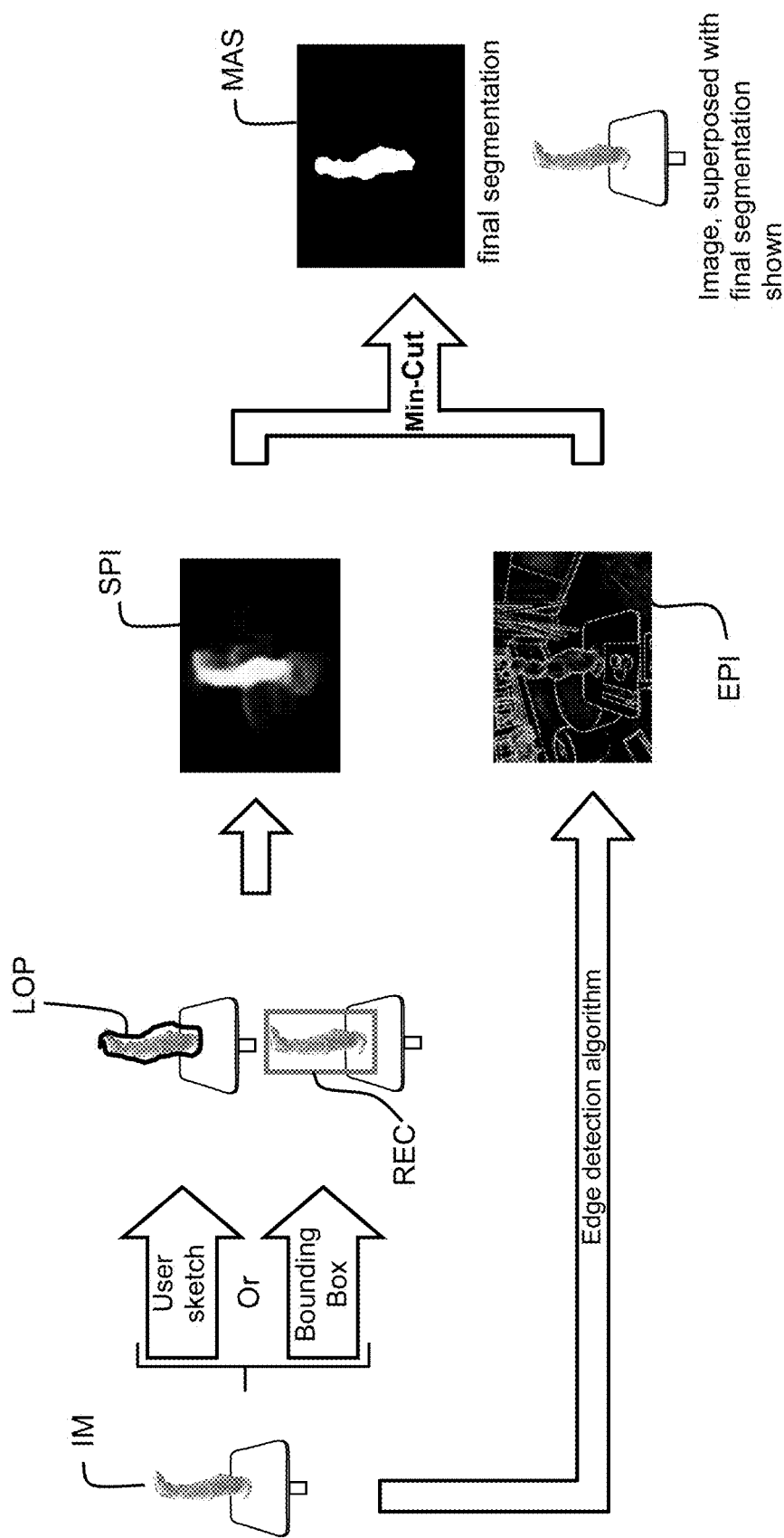
FIG. 3 illustrates the computing of a binary mask, based on an image example.

As illustrated in FIG. 3, it must be considered whether the image is calibrated or not. The image is said to be calibrated if the position and orientation of the camera are known, which means finding the camera intrinsic and extrinsic parameters from several views of a calibration pattern. It is also referred to the notion of camera calibration in the state of the art.

Figure 5:
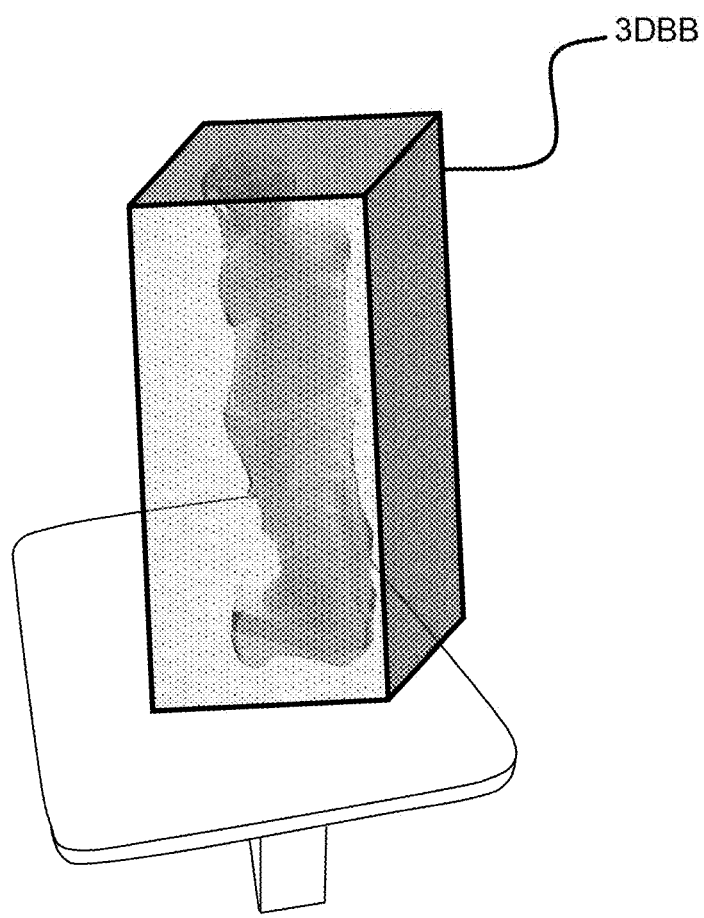
FIG. 5 illustrates a 3D bounding box which is provided when the camera is calibrated.

If the image is calibrated, a 3D bounding box 3DBB enclosing the object OBJ is provided in the 3D space, as illustrated by FIG. 5. The 3D bounding box 3DBB is anchored to the object OBJ, and may be modified by the user by interacting with the 3D bounding box 3DBB, for example by dragging edges or corners of the 3D bounding box 3DBB. It is not necessary that the 3D bounding box 3DBB encloses exactly the minimum volume of the object OBJ. As explained below, the dimensions 3D bounding box 3DBB may be refined from one image to the other.

The 3D bounding box 3DBB is a parallelogram with eight vertices and six faces. For each image IM, the eight vertices of the 3D bounding box 3DBB are projected on the camera plane, and the smallest rectangle REC containing the eight projected vertices is computed. The smallest rectangle REC contains, by definition, the object to segment. For each image, using the smallest rectangle REC and the original image, the segmentation probabilities image SPI is inferred, by using a segmentation algorithm. The segmentation algorithm may be selected in a group comprising thresholding, histogram-based bundling, region-growing, k-means clustering, watersheds, active contours, graph cuts, conditional and Markov random fields, and sparsity-based methods. In an embodiment, a deep learning algorithm may be used. Deep learning algorithms, for example DeepLabv3 have shown remarkable results for the segmentation of images.

If the image is not calibrated, the user cannot rely on a 3D bounding box. Therefore, starting from the image IM, he draws a line with the mouse of the computer or with an appendage in touch mode (finger or stylus), so as to close a contour of the object to segment, thereby forming a loop LOP, as illustrated by FIG. 3. The loop LOP can be coarse, but it needs, however, to be as close as possible to the object OBJ, so as to avoid enclosing another object in the loop LOP. Should the loop LOP not be exactly close, a threshold may be applied. Given two extremities (EL1, EL2) of the loop, the loop LOP may be automatically closed if both extremities (EL1, EL2) are distant of less than a predefined threshold. The threshold may be expressed in pixels or in a metric distance. The threshold may be equal to 5% of the image diagonal (distance in pixels). Therefore, the line which is drawn by the user does not need to exactly fit the real contour of the object.

Then, once the user has finished drawing the loop LOP, a rough segmentation probabilities image is provided, with all outer pixels filled with the minimum probability value (for example 0 in a 8-bit scheme), and all inner pixels filled with the maximal probability value (for example 255 in a 8-bit scheme for representing an image in shades of grey). Then, a gradient is applied from the maximal probability value to the minimum probability value. The gradient may be applied either on the pixels of the loop LOP if the latter has a width of more than one pixels, or the gradient may also be applied on the pixels which are located on both sides of the loop LOP, on a predefined width of the loop LOP. Therefore, the segmentation probabilities image SPI has smooth borders from the minimal value (0) to the maximal value (255).

Figure 4:
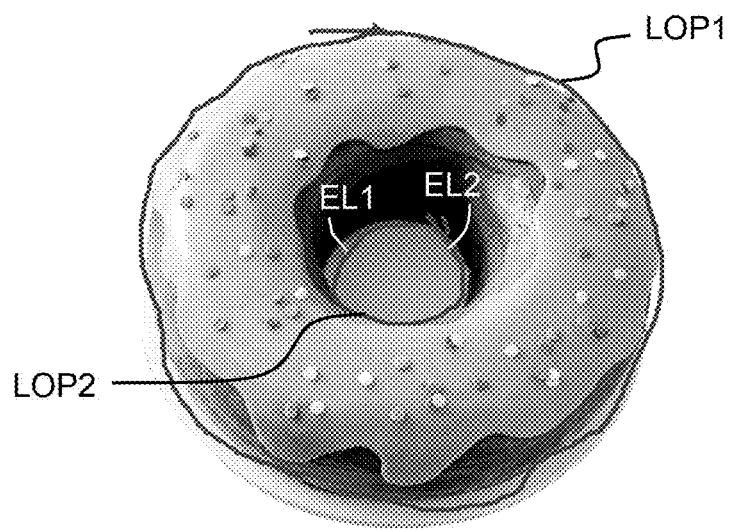
FIG. 4 illustrates the sketching of several contour of the object for segmenting the image, when there is no bounding box (i.e. when the camera is not calibrated)

In another embodiment, which is illustrated by FIG. 4, if several loops are contained one in the other, the minimal probability value and the maximal probability value are alternatively assigned to the corresponding areas. Returning to the example of FIG. 4, the object to segment is a doughnut, with a hole in the middle. Therefore, the user draws a first loop LOP1 for the external contour of the doughnut, and a second loop LOP2 for the contour of the hole. In that case, all the pixels outside the first loop LOP1 and inside the second loop LOP2 are filled with the minimum probability value, whereas all the pixels which are located between the first loop LOP1 and the second loop LOP2 are filled with the maximal probability value. Of course, this embodiment is not limited to two loops, and it can be extended to more than two loops. According to this embodiment, it is also possible to apply gradients so as to have smooth borders from the minimal value to the maximal value. The loops LOP1 and LOP2 may also automatically be closed if it has not been done by the user.

A 2D bounding box can also be obtained by computing the smallest 2D bounding box of the loop LOP, or by instructing the user to place two points on the image, corresponding to the top-left point and to the bottom-right point (or top-right point and bottom-left point) of the 2D bounding box.

Once the edge probabilities image EPI and the segmentation probabilities image SPI have been computed, the invented method comprises a step c) of computing a binary mask MAS of the object OBJ based on the edge probabilities image EPI and based on the segmentation probabilities image SPI. The combination of edge detection with segmentation has not been disclosed up to now in the state of the art, and provides a high precision mask, avoiding a "drool" effect from one image to the other.

In an embodiment, the optimal mask of the object is computed by energy minimization. The energy to minimize is:

$$E = E_{mask\ probs} + \lambda E_{edges\ probs}$$

Where E is the global energy function to minimize, $E_{mask\ probs}$ is the energy contribution of the segmentation probabilities image SPI, $E_{edges\ probs}$ is the energy contribution of the edge probabilities image EPI, and $\lambda$ is a parameter.

Figure 6:
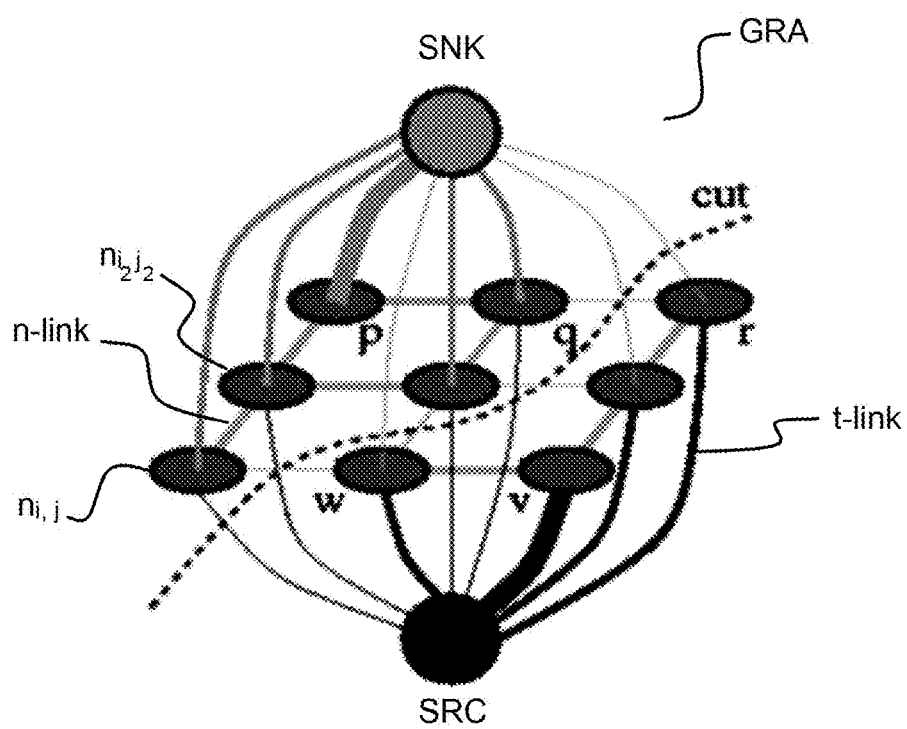
FIG. 6 illustrates the graph which is used for the max-flow/min-cut algorithm.

In a first sub-step c1) a graph GRA is built, as illustrated by FIG. 6. The graph GRA comprises a plurality of nodes $n_{i,j}$ (i=1 ... M and j=1 ... N, M and N are the number of pixels of the image IM in two dimensions), and each node represents a pixel of the image IM acquired by the camera CAM. There are also two specially designated terminal nodes, the source SRC and the sink T which respectively represent "object" and "background" labels. Typically, neighboring pixels are interconnected by edges in a regular grid-like fashion. Edges between pixels are called n-links where n stands for "neighbor". Another type of edges, called t-links, are used to connect pixels to terminal nodes.

On FIG. 6, the cost of each edge is reflected by the edge's thickness. Let's name $m_{i,j}$ the value (probability between 0 and 255) of the pixel $p_{i,j}$ in the segmentation probabilities image SPI; and $e_{i,j}$ the value of the pixel $p_{i,j}$ in the edges probabilities image EPI. In the graph GRA, each node represents a pixel, and each link has a cost (or capacity) C. In a sub-step c2), we define here the cost C of each link:

$$C_{SRC \leftrightarrow n_{ij}} = m_{i,j}$$

$$C_{SNK \leftrightarrow n_{ij}} = 255 - m_{i,j}$$

$$C_{n_{ij} \leftrightarrow n_{i_2,j_2}} = \frac{(255 - e_{i,j}) + (255 - e_{i_2,j_2})}{2}$$

$C_{n_{ij} \leftrightarrow n_{i_2,j_2}}$ is a link cost which is equal to the probability that there is no edge between corresponding adjacent pixels, where $n_{i,j}$ and $n_{i_2,j_2}$ are horizontal or vertical neighbor nodes.

$C_{SRC \leftrightarrow n_{ij}}$ is a source cost which is equal to the probability that the corresponding pixel belongs to the object.

$C_{SNK \leftrightarrow n_{ij}}$ is a sink cost which is equal to the probability that the corresponding pixel does not belong to the object.

It can be noted that it would be possible to scale all the probability values, from integers in [0, 255] to floats in [0, 1]. The interest to keep the whole values in [0, 255] is to be able to continue to encode the values on only 8 bits/pixel, unlike floats, which are usually encoded in 32 or 64 bits. This saves computing time on the resolution of the energy minimization.

Then, in sub-step c3), the global energy function E is minimized by solving a max-flow algorithm. Then, to perform the segmentation, a min-cut is carried out. It separates the source SRC and the sink SNK, and minimizes the sum of the link costs, source costs and sink costs of the corresponding n-links or t-inks that the cut severs. From this cut, only the nodes linked to the source are considered as belonging to the object. Therefore, a high precision binary mask MAS is obtained, as illustrated by FIG. 3 ("final segmentation"). FIG. 3 also illustrates the initial image IM, on which the high precision binary mask MAS is superposed.

Referring to FIG. 2, the invented method may end once the mask MAS been computed in step c).

Figure 7:
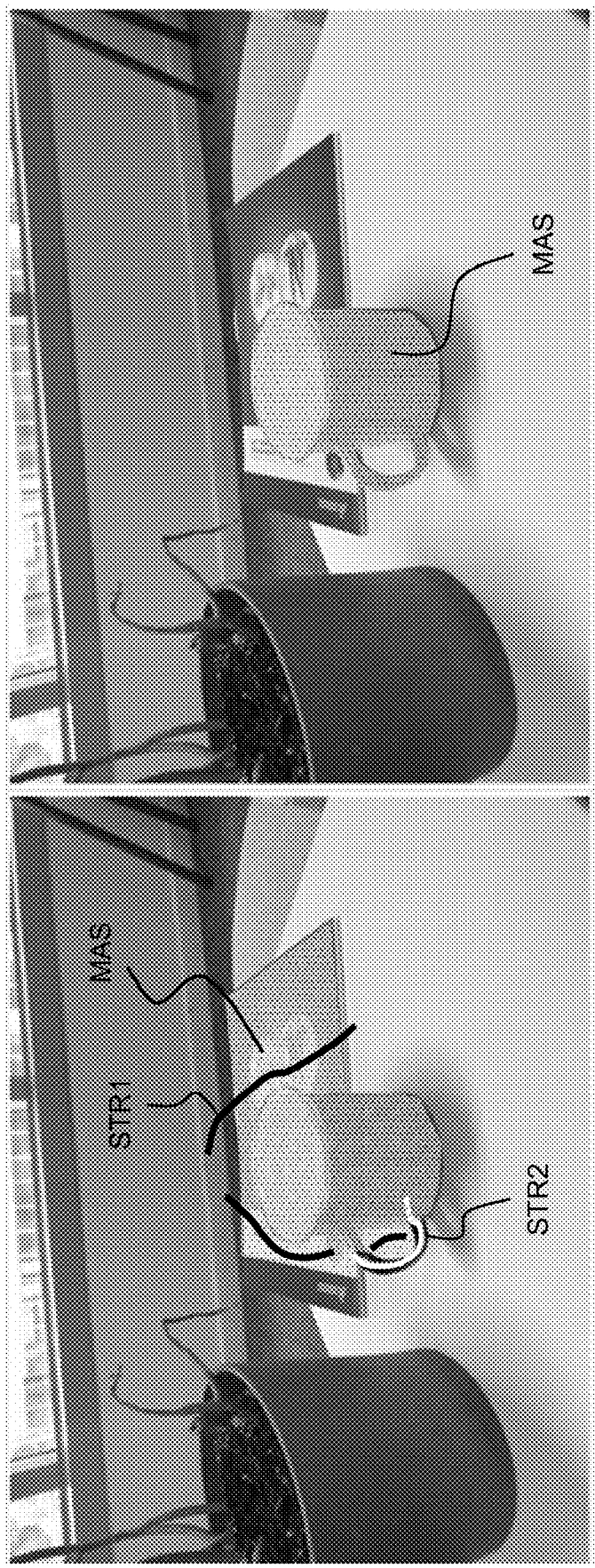
FIG. 7A illustrates user strokes for correcting the binary mask.
FIG. 7B illustrates the result of the correction.

In an embodiment, the user may also correct the mask MAS so as to improve the quality of the segmentation, as illustrated by FIGS. 7A and 7B. The correction may be done in steps d) and e), as illustrated by FIG. 2.

The method comprises a step d) of displaying the binary mask MAS, superimposed on the image IM, in partial transparency. Then, a test 100 is made: if the user decides not to correct the mask, or if it is automatically detected that the mask does not need to be corrected, the method continues until test 200, which will be further developed. For example, the mask may be considered correct if the global energy function is below a predefined threshold. On the contrary, it may turn out that that the mask MAS needs to be corrected, as it is the case on FIG. 7A. Indeed, the mask MAS mistakenly comprises the notebook and the inner part of the handle of the cup, whereas the handle itself does not belong to the mask.

Then, in step e), the user is instructed to draw a stroke of a first predefined color STR1 on a part of the binary mask which should be removed, and/or a stroke of a second predefined color STR2 on a part of the object which should be added to the binary mask. For that, the user may use a palette or a menu in order to select the color. For example, the user may draw a red stroke STR1 on the part which should be removed, and a yellow stroke STR2 on the part which should be added. Of course, the disclosure is not limited to those combinations. Then, the aforementioned costs are updated as follows:

A null source cost $C_{SRC \leftrightarrow n_{ij}}$ is assigned to the node if the corresponding pixel is colored with the first predefined color, and an infinity source cost to the node if the corresponding pixel is colored with the second predefined color:

$$C_{SRC \leftrightarrow n_{ij}} = \begin{cases} 0 & \text{if } p_{ij} \text{ is drawn in the first predefined colour} \\ \infty & \text{if } p_{ij} \text{ is drawn in the second predefined colour} \\ m_{ij} & \text{otherwise} \end{cases}$$

$p_{ij}$ is the pixel of the image IM which corresponds to the node $n_{ij}$.

An infinity sink cost $C_{SNK \leftrightarrow n_{ij}}$ is assigned to the node if the corresponding pixel is drawn with the first predefined color, and a null source cost to the node if the corresponding pixel is drawn with the second predefined color:

$$C_{SNK \leftrightarrow n_{ij}} = \begin{cases} \infty & \text{if } p_{ij} \text{ is drawn in the first predefined colour} \\ 0 & \text{if } p_{ij} \text{ is drawn in the second predefined colour} \\ 255 - m_{ij} & \text{otherwise} \end{cases}$$

The link cost remains unchanged:

$$c_{n_{ij} \leftrightarrow n_{i_2 j_2}} = \frac{(255 - e_{i,j}) + (255 - e_{i_2,j_2})}{2}$$

Then, step c) of computing a binary mask MAS is reiterated with the modified source and sink costs. If necessary, the step of correction of the mask may be implemented another time. With this embodiment, a reliable high precision binary segmentation of the object is obtained, with minimum and simple user inputs (simple strokes).

Test 200 determines if there is another image to segment. By "another image", it is meant another image with the same object, from another point of view. If not, the method terminates, with the obtained mask MAS. On the contrary, it is determined if the image is calibrated or not (test 300).

Figure 8:
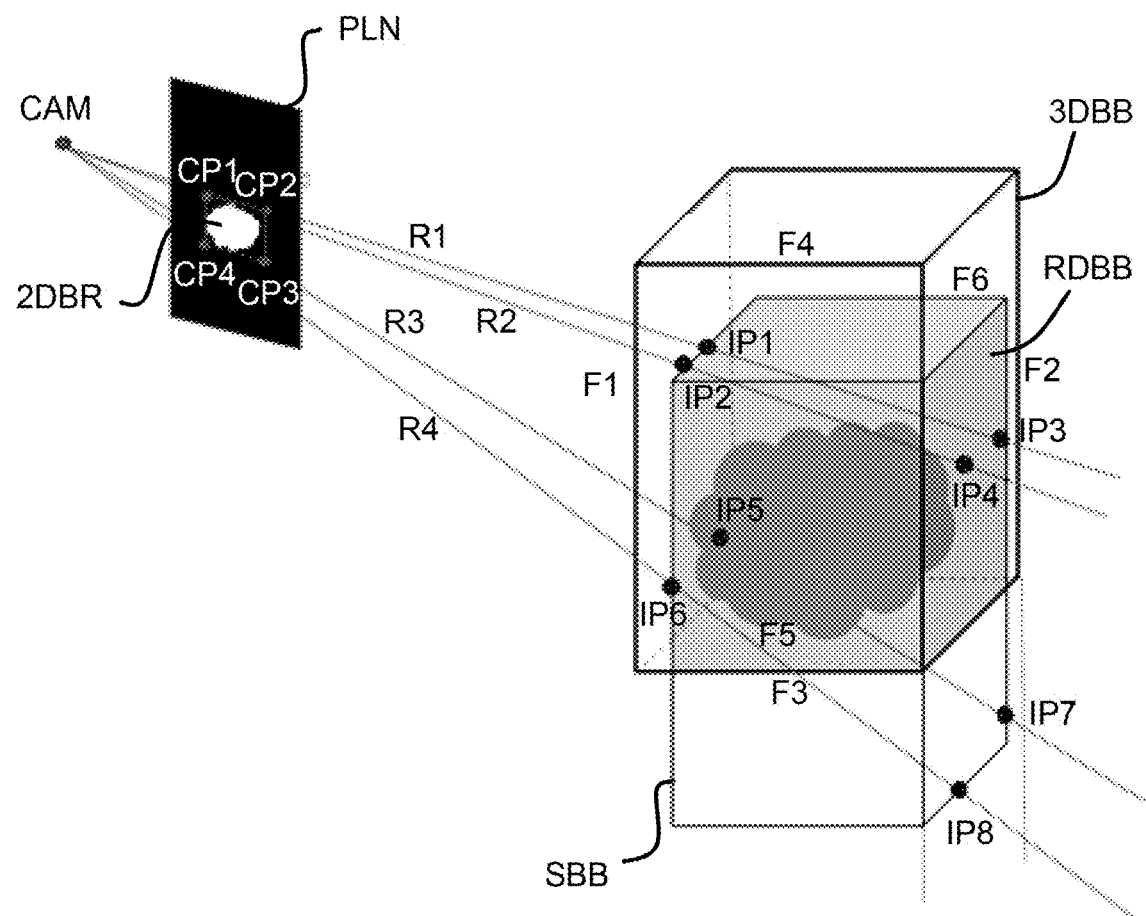
FIG. 8 illustrates the step of refinement of the 3D bounding box, according to a first embodiment.

We consider, according to a first hypothesis, that the image is calibrated, which implies that a 3D bounding box 3DDBB enclosing the object OBJ is provided. The next step f) consists in refining the 3D bounding box 3DDBB for the image which has been validated by the user, as illustrated by FIG. 8, so as to enhance the quality of the mask for the other image. The 3D bounding box 3DDBB has six faces (F1, F2, F3, F4, F5, F6), and all of them are separately projected in the camera plane PLN. If the whole mask fits entirely within one of the projected faces (typically it appends if the image is a canonical view of the object), referred to as first face F1, a 2D bounding rectangle 2DBR enclosing the mask MAS is generated. Four corner points (CP1, CP2, CP3, CP4) of the 2D bounding rectangle are derived. Since the camera is calibrated, we also have the 3D coordinates of the four corner points (CP1, CP2, CP3, CP4) are also known. Then, four rays (R1, R2, R3, R4) are cast from the camera CAM to the respective four corner points (CP1, CP2, CP3, CP4). The equation of each of the four 3D lines (corresponding to the ray) passing through the center of the calibrated camera and the 3D corner points of the bounding rectangle is computed. The intersection of these four lines with the plane of the first face F1, and with the plane of its opposite face F2, gives eight intersection points (IP1, IP2, IP3, IP4, IP5, IP6, IP7, IP8). Then, the smallest 3D bounding box SBB containing the eight intersection points (IP1, IP2, IP3, IP4, IP5, IP6, IP7, IP8) is generated. Lastly, the intersection of the 3D bounding box 3DBB with the smallest 3D bounding box SBB is computed, thereby obtaining a refined 3D bounding box RBB.

Once the 3D bounding box has been refined, the mask MAS is computed by iterating steps a) to c) with the refined 3D bounding box RBB, instead of using the initial 3D bounding box 3DBB. In particular, the segmentation probabilities image SPI is computed based on the refined 3D bounding box RBB. The bounding box is refined for each image whose segmentation has been validated (by the user, through the correction of the segmentation with user strokes, or automatically, if the energy function is below a predefined threshold). Therefore, the reliable information which is obtained from the corrected mask (after user correction) is propagated to the other images, which enhances the segmentation quality.

Figure 9:
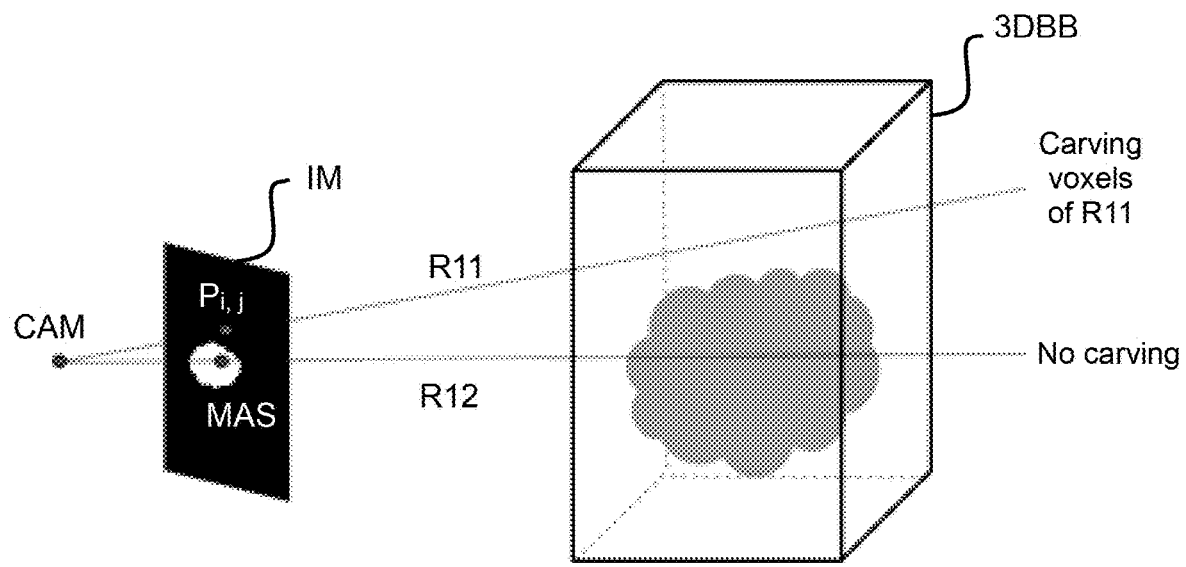
FIG. 9 illustrates the step of refinement of the 3D bounding box, according to a second embodiment.

In step f), if it turns out that the whole mask does not fit entirely within one of the projected faces (which can happen if the image is not a canonical view of the object), the 3D bounding box 3DBB is discretized into a grid of voxels (for example 256 voxels in each direction). As illustrated by FIG. 9, for each pixel $p_{ij}$ of the image IM, a ray (R11, R12) is cast from the camera, and if the pixel does not belong to the mask MAS, the voxels of the 3D bounding box 3DBB which intersect said ray are carved. On the contrary, if the pixel belongs to the mask MAS, there is no carving of the 3D bounding box 3DBB along said ray. Once all the rays have been cast, for all the pixels, a new carved voxel grid is obtained. Then, the new carved voxel grid is projected on each new image for which the mask has not been validated. A ray is cast from the camera towards each pixel of the image, and it is determined, for each pixel of the image, if said ray intersects a non-carved voxel, and if so, a binary predefined value (for example value=1) is assigned on said pixel. Then, a new 2D bounding box is generated on said another image by using the pixels having the binary predefined value, by determining the smallest rectangle which encloses all the pixels having the binary predefined value.

Therefore, the reliable information which is obtained from the corrected mask (after user correction) is also propagated to the other images, which enhances the segmentation quality, even though the whole mask does not fit entirely within one of the projected faces.

To conclude, when the corrected mask can be propagated to other images, which is the case when the image is calibrated, the segmentation of the object from another viewpoint can be done with a refined 3D bounding box (step h), FIG. 2). Then, the mask is computed with the aforementioned steps a) to c). Otherwise, when the segmentation probabilities image SPI has been computed by instructing the user to draw a loop enclosing the object (see FIG. 3), there is no propagation of the mask. Therefore, for other images, the user needs to draw a new line closing the contour of the object so as to obtain the segmentation probabilities image SPI (step g), FIG. 2) for each other image.

Figure 10:
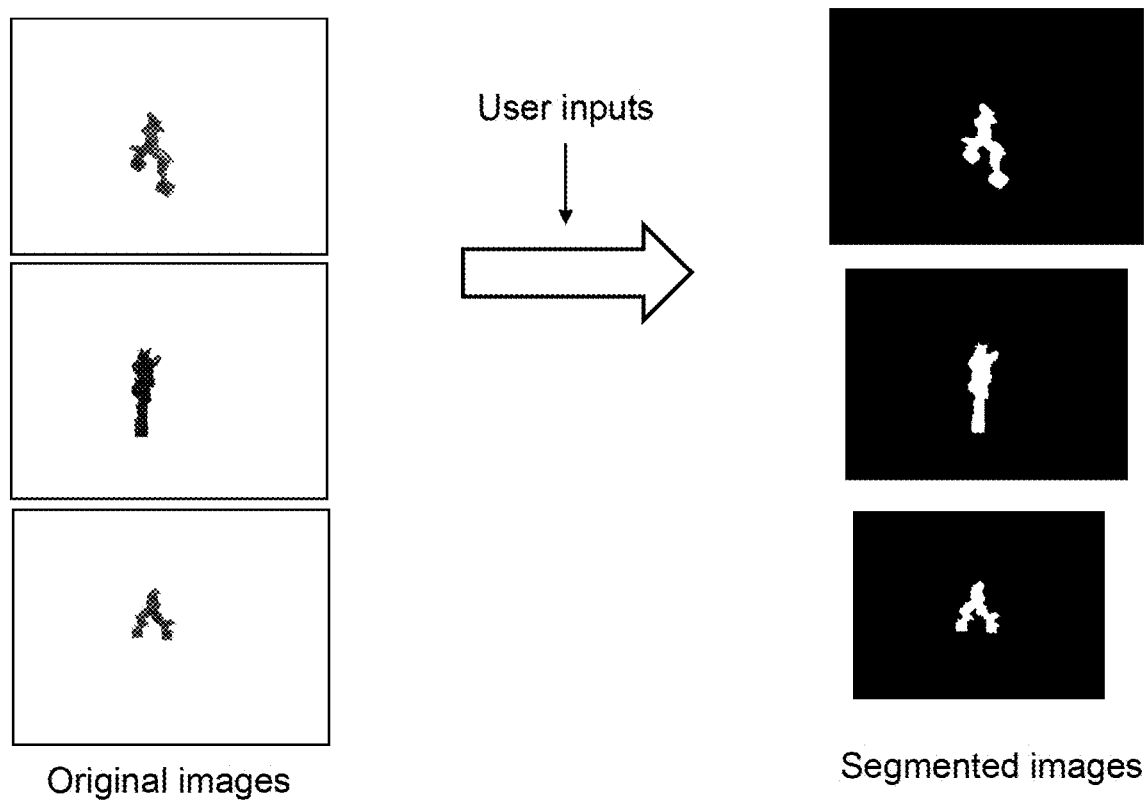
FIG. 10 illustrates the result of the method according to an embodiment, for a multiview segmentation.

FIG. 10 illustrates, on the left, original images of an object to segment. The images have been acquired from different viewpoints. The segmentation has been done with the invented method, and it can be seen that the masks are very precise, for all the points of view.

The inventive method can be performed by a suitably-programmed general-purpose computer or computer system, possibly including a computer network, storing a suitable program in non-transitory form on a computer-readable medium such as a hard disk, a solid state disk or a CD-ROM and executing said program using its microprocessor(s) and memory.

Figure 11:
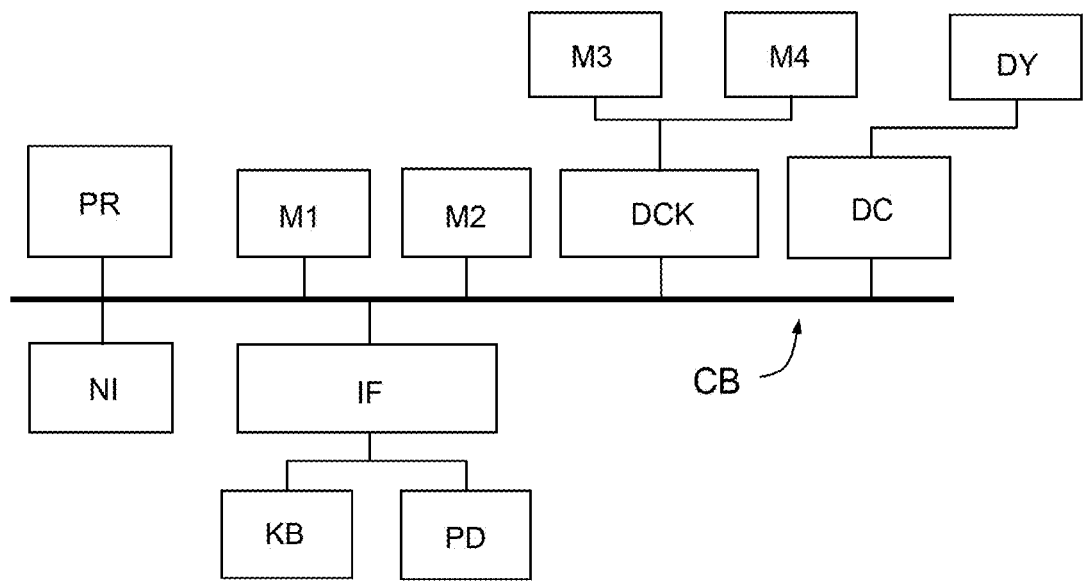
FIGS. 11 and 12 are block diagrams of respective computer systems suitable for carrying out a method according to different embodiments.

A computer suitable for carrying out a method according to an exemplary embodiment is described with reference to FIG. 11. In FIG. 11, the computer includes a Central Processing Unit CPU which performs the processes described above. The process can be stored as an executable program, i.e. a set of computer-readable instructions in memory, such as RAM M1 or ROM M2, or on hard disk drive (HDD) or solid-state driver (SDD) M3, DVD/CD drive M4, or can be stored remotely. Moreover, one or more computer files defining one or more digital body model and/or skeleton may also be stored on one or more of memory devices M1 to M4, or remotely.

The claimed invention is not limited by the form of the computer-readable media on which the computer-readable instructions and/or the digital files of the inventive process are stored. For example, the instructions and files can be stored on CDs, DVDs, in FLASH memory, RAM, ROM, PROM, EPROM, EEPROM, hard disk or any other information processing device with which the computer communicates, such as a server or another computer. The program and the files can be stored on a same memory device or on different memory devices.

Further, a computer program suitable for carrying out the inventive method can be provided as a utility application, background daemon, or component of an operating system, or combination thereof, executing in conjunction with CPU and an operating system such as Microsoft Windows 10, UNIX, Solaris, LINUX, Apple MAC-OS and other systems known to those skilled in the art.

The Central Processing Unit CPU can be a Xenon processor from Intel of America or an Opteron processor from AMD of America, or can be other processor types, such as a Freescale ColdFire, IMX, or ARM processor from Freescale Corporation of America. Alternatively, the Central Processing Unit can be a processor such as a Core2 Duo from Intel Corporation of America, or can be implemented on an FPGA, ASIC, PLD or using discrete logic circuits, as one of ordinary skill in the art would recognize. Further, the Central Processing Unit can be implemented as multiple processors cooperatively working to perform the computer-readable instructions of the inventive processes described above.

The computer in FIG. 11 also includes a network interface NI, such as an Intel Ethernet PRO network interface card from Intel Corporation of America, for interfacing with a network, such as a local area network (LAN), wide area network (WAN), the Internet and the like. The Computer Aided Design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface, used by the user to provide input commands—e.g. to draw a contour of the object to segment if a bounding box is not provided, draw stroke so as to correct the mask—and by the Computer Aided Design station for displaying the image superimposed with the mask.

Disk controller DKC connects HDD M3 and DVD/CD M4 with communication bus CBS, which can be an ISA, EISA, VESA, PCI, or similar, for interconnecting all of the components of the Computer Aided Design station.

A description of the general features and functionality of the display, keyboard, pointing device, as well as the display controller, disk controller, network interface and I/O interface is omitted herein for brevity as these features are known.

Figure 12:
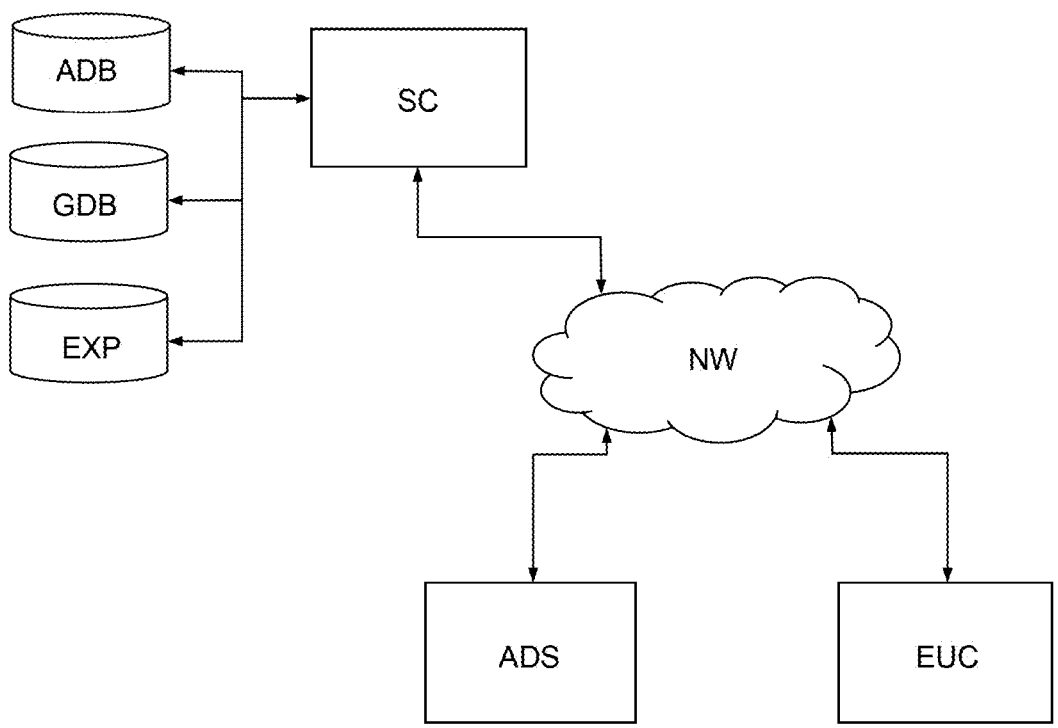

FIG. 12 is a block diagram of a computer system suitable for carrying out a method according to a different exemplary embodiment.

In FIG. 12, the executable program EXP and the computer file(s) defining the mask(s) are stored on memory devices connected to a server SC. The memory devices and the overall architecture of the server may be the same as discussed above with reference to FIG. 11, except that display controller, display, keyboard and/or pointing device may be missing in the server. The server SC is then connected to an administrator system ADS and end user computer EUC via a network NW. The overall architectures of the administrator system and of the end user computer may be the same as discussed above with reference to FIG. 11, except that the memory devices of the administrator system and the end user computer do not store the executable program EXP and/or the computer file(s) defining the mask(s). However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database DB stored by the server SC and containing files defining the mask(s). The server performs the processing as described above, and transmits to the end user computer an image file corresponding to the image on which the mask is superimposed, again using the network NW.

Although only one administrator system ADS and one end user system EUX are shown, the system can support any number of administrator systems and/or end user systems without limitation. Similarly, multiple servers can also be implemented in the system without departing from the scope of the present disclosure.

Any processes described herein should be understood as representing modules, segments, or portions of code which include one or more executable instructions for implementing specific logical functions or steps in the process, and alternate implementations are included within the scope of the exemplary embodiment.

The invention claimed is:

1. A computer-implemented method for segmenting an object in at least one image acquired by a camera, comprising:
   a) computing an edge probabilities image based on the image, said edge probabilities image including, for each pixel of the image, the probability that said pixel is an edge;
   b) computing a segmentation probabilities image based on the image, said segmentation probabilities image including, for each pixel of the image, the probability that said pixel belongs to the object; and
   c) computing a binary mask of the object based on the edge probabilities image and based on the segmentation probabilities image,
   wherein step c) further comprises sub-steps of:
   c1) building a graph including a plurality of nodes connected one to the other through n-links, each node representing a pixel of the image acquired by the camera, said graph including also a source, which represents the object, and a sink which represents a background of the image, each node being connected to the source and to the sink through t-links;
   c2) defining:
      for each n-link, a link cost which is equal to the probability that there is no edge between corresponding adjacent pixels;
      for each t-link, a source cost which is equal to the probability that the corresponding pixel belongs to the object, and a sink cost which is equal to the probability that the corresponding pixel does not belong to the object; and
   c3) computing a minimum cut which separates the source and the sink and which minimizes a sum of the link costs, source costs and sink costs of the corresponding n-links or t-links that the cut severs.

2. The method according to claim 1, further comprising, after step c):
   d) displaying the binary mask, superimposed on the image, in partial transparency;
   e) correcting the binary mask (MAS) by:
      instructing the user to draw a stroke of a first predefined color on a part of the binary mask which should be removed, and/or a stroke of a second predefined color on a part of the object which should be added to the binary mask,
      modifying the sink cost and source cost of each node by:
         assigning a null source cost to the node if the corresponding pixel is drawn with the first predefined color, and an infinity source cost to the node if the corresponding pixel is drawn with the second predefined color,
         assigning an infinity sink cost to the node if the corresponding pixel is drawn is drawn with the first predefined color, and a null source cost to the node if the corresponding pixel is drawn with the second predefined color,
      wherein the step c) of computing the binary mask being reiterated with the modified source and sink costs.

3. The method according to claim 1, further comprising preliminarily calibrating the camera and providing a 3D bounding box enclosing the object and having eight vertices and six faces,
   wherein step b) of computing the segmentation probabilities image further comprises sub-steps of:
      projecting the eight vertices on a camera plane;
      generating the smallest rectangle containing the projected eight vertices; and
      computing the segmentation probabilities image by using a segmentation algorithm on the smallest rectangle.

4. The method according to claim 3, wherein the segmentation algorithm is a deep learning algorithm.

5. The method according to claim 3, further comprising
   f) refining the 3D bounding box including sub-steps of:
      projecting each of the six faces of the 3D bounding box in the camera plane;
      determining if the binary mask fits entirely within one of the projected faces being a first face;
      if the binary make fits entirely within the first face, generating a 2D bounding rectangle enclosing the mask and deriving four corner points of the 2D bounding rectangle;
      casting four rays from the camera to the respective four corner points;
      computing intersections of the four rays with the plane of the first face, and with the plane of a face which is opposite to the first face being a second face, thereby obtaining eight intersection points;
      generating the smallest 3D bounding box containing the eight intersection points; and
      computing a refined 3D bounding box, which is the intersection of the 3D bounding box with the smallest 3D bounding box,
   wherein steps a) to c) are iterated a plurality of times for different images acquired from different viewpoints, by using the refined 3D bounding box for each next iteration.

6. The method according to claim 5, further comprising, if it is determined that the binary mask does not fit entirely within any of the projected faces:
   discretizing the 3D bounding box into a grid of voxels;
   for each pixel of the image, casting a ray from the camera, and if the pixel does not belong to the mask, carving the voxels which intersect said ray, thereby obtaining a new carved voxel grid;
   for another image, casting a ray from the camera, and determining, for each pixel of said another image, if said pixel intersects a non-carved voxel, and if so, assigning a predefined binary value to said pixel; and
   generating a new 2D bounding box on said another image by using the pixels having the predefined value.

7. A computer-implemented method for segmenting an object in at least one image acquired by a camera, comprising:
   a) computing an edge probabilities image based on the image, said edge probabilities image including, for each pixel of the image, the probability that said pixel is an edge;
   b) computing a segmentation probabilities image based on the image, said segmentation probabilities image including, for each pixel of the image, the probability that said pixel belongs to the object; and
   c) computing a binary mask of the object based on the edge probabilities image and based on the segmentation probabilities image,
   wherein step b) of computing the segmentation probabilities image further comprises sub-steps of:
      instructing the user to draw a line closing a contour of the object, thereby forming a loop;

assigning a maximal probability value to pixels which are located within the loop, and a minimal probability value to pixels which are located outside the loop; and assigning a gradient to the probability value around to the pixels which are located outside the loop.

8. The method according to claim 7, wherein step b) of computing the segmentation probabilities image further comprises a further sub-step of automatically completing the loop if extremities of the loop are distant of less than a predefined threshold.

9. The method according to claim 8, wherein the predefined threshold is equal to 5% of the diagonal of the image.

10. The method according to claim 7, wherein step b) of computing the segmentation probabilities image further comprises a further sub-step of alternatively assigning a minimal probability value and a maximal probability value if several loops are drawn into each other.

11. A computer-implemented method for segmenting an object in at least one image acquired by a camera, comprising:
   a) computing an edge probabilities image based on the image, said edge probabilities image including, for each pixel of the image, the probability that said pixel is an edge;
   b) computing a segmentation probabilities image based on the image, said segmentation probabilities image including, for each pixel of the image, the probability that said pixel belongs to the object; and
   c) computing a binary mask of the object based on the edge probabilities image and based on the segmentation probabilities image,
   wherein the step a) of computing the edge probabilities image uses a deep learning algorithm, said deep learning algorithm using a holistically-nested edge detection.

12. A non-transitory computer-readable data-storage medium containing computer-executable instructions that when executed by a computer system causes the computer system interfaced to a camera to carry out a method comprising:
   a) computing an edge probabilities image based on the image, said edge probabilities image including, for each pixel of the image, the probability that said pixel is an edge;
   b) computing a segmentation probabilities image based on the image, said segmentation probabilities image including, for each pixel of the image, the probability that said pixel belongs to the object; and
   c) computing a binary mask of the object based on the edge probabilities image and based on the segmentation probabilities image,
   wherein step c) further comprises sub-steps of:
   c1) building a graph including a plurality of nodes connected one to the other through n-links, each node representing a pixel of the image acquired by the camera, said graph including also a source, which represents the object, and a sink which represents a background of the image, each node being connected to the source and to the sink through t-links;
   c2) defining:
      for each n-link, a link cost which is equal to the probability that there is no edge between corresponding adjacent pixels;
      for each t-link, a source cost which is equal to the probability that the corresponding pixel belongs to the object, and a sink cost which is equal to the probability that the corresponding pixel does not belong to the object; and
   c3) computing a minimum cut which separates the source and the sink and which minimizes a sum of the link costs, source costs and sink costs of the corresponding n-links or t-links that the cut severs.

13. A computer system comprising:
   a processor coupled to a memory, a screen and a camera, the memory storing computer-executable instructions that when executed by the processor causes the processor to be configured to:
   compute an edge probabilities image based on the image, said edge probabilities image including, for each pixel of the image, the probability that said pixel is an edge,
   compute a segmentation probabilities image based on the image, said segmentation probabilities image including, for each pixel of the image, the probability that said pixel belongs to the object, and
   compute a binary mask of the object based on the edge probabilities image and based on the segmentation probabilities image,
   wherein the processor is further configured to:
   build a graph including a plurality of nodes connected one to the other through n-links, each node representing a pixel of the image acquired by the camera, said graph including also a source, which represents the object, and a sink which represents a background of the image, each node being connected to the source and to the sink through t-links;
   define:
      for each n-link, a link cost which is equal to the probability that there is no edge between corresponding adjacent pixels;
      for each t-link, a source cost which is equal to the probability that the corresponding pixel belongs to the object, and a sink cost which is equal to the probability that the corresponding pixel does not belong to the object; and
   compute a minimum cut which separates the source and the sink and which minimizes a sum of the link costs, source costs and sink costs of the corresponding n-links or t-links that the cut severs.

14. A non-transitory computer-readable data-storage medium containing computer-executable instructions that when executed by a computer system causes the computer system interfaced to a camera to carry out a method comprising:
   a) computing an edge probabilities image based on the image, said edge probabilities image including, for each pixel of the image, the probability that said pixel is an edge;
   b) computing a segmentation probabilities image based on the image, said segmentation probabilities image including, for each pixel of the image, the probability that said pixel belongs to the object; and
   c) computing a binary mask of the object based on the edge probabilities image and based on the segmentation probabilities image,
   wherein step b) of computing the segmentation probabilities image further comprises sub-steps of:
      instructing the user to draw a line closing a contour of the object, thereby forming a loop;
      assigning a maximal probability value to pixels which are located within the loop, and a minimal probability value to pixels which are located outside the loop; and assigning a gradient to the probability value around to the pixels which are located outside the loop.

15. A computer system comprising:
a processor coupled to a memory, a screen and a camera, the memory storing computer-executable instructions that when executed by the processor causes the processor to be configured to:
compute an edge probabilities image based on the image, said edge probabilities image including, for each pixel of the image, the probability that said pixel is an edge,
compute a segmentation probabilities image based on the image, said segmentation probabilities image including, for each pixel of the image, the probability that said pixel belongs to the object, and
compute a binary mask of the object based on the edge probabilities image and based on the segmentation probabilities image,
wherein the processor is further configured to:
instruct the user to draw a line closing a contour of the object, thereby forming a loop;
assigning a maximal probability value to pixels which are located within the loop, and a minimal probability value to pixels which are located outside the loop; and
assigning a gradient to the probability value around to the pixels which are located outside the loop.

16. A non-transitory computer-readable data-storage medium containing computer-executable instructions that when executed by a computer system causes the computer system interfaced to a camera to carry out a method comprising:

a) computing an edge probabilities image based on the image, said edge probabilities image including, for each pixel of the image, the probability that said pixel is an edge;
b) computing a segmentation probabilities image based on the image, said segmentation probabilities image including, for each pixel of the image, the probability that said pixel belongs to the object; and
c) computing a binary mask of the object based on the edge probabilities image and based on the segmentation probabilities image,
wherein the step a) of computing the edge probabilities image uses a deep learning algorithm, said deep learning algorithm using a holistically-nested edge detection.

17. A computer system comprising:
a processor coupled to a memory, a screen and a camera, the memory storing computer-executable instructions that when executed by the processor causes the processor to be configured to:
compute an edge probabilities image based on the image by using a deep learning algorithm, said deep learning algorithm using a holistically-nested edge detection, said edge probabilities image including, for each pixel of the image, the probability that said pixel is an edge,
compute a segmentation probabilities image based on the image, said segmentation probabilities image including, for each pixel of the image, the probability that said pixel belongs to the object, and
compute a binary mask of the object based on the edge probabilities image and based on the segmentation probabilities image.

* * * * *